April 21, 1959 R. L. SHANKLAND 2,883,084
STRAINERS OR LIKE PRESSURE VESSELS
Filed Aug. 10, 1955
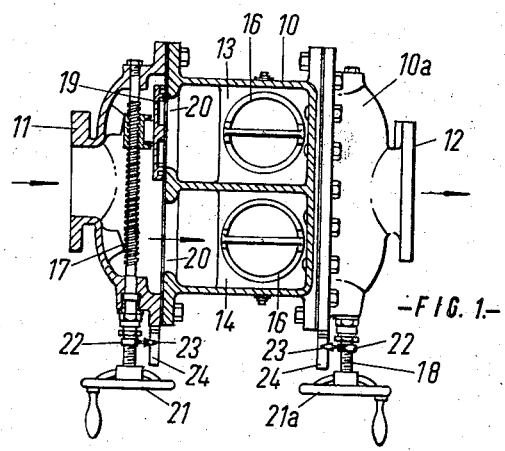
–FIG. 1.–
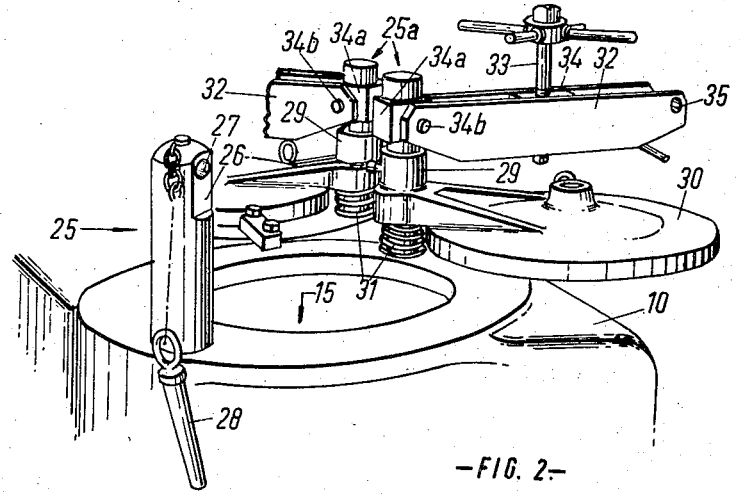
–FIG. 2.–
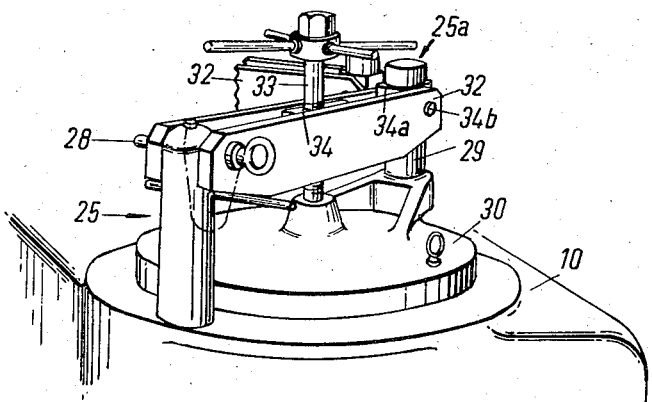
–FIG. 3.–
Inventor
Robert L. Shankland
By
Attorney United States Patent Office 2,883,084
Patented Apr. 21, 1959

2,883,084

STRAINERS OR LIKE PRESSURE VESSELS

Robert Leslie Shankland, Lymm, England, assignor to Royles Limited, Manchester, England, a British company Application August 10, 1955, Serial No. 527,577

Claims priority, application Great Britain August 12, 1954

2 Claims. (Cl. 220—55)

This invention concerns pressure vessels such as strainers of the type used in pipelines and in which the strainer cage which is located in a housing may be removed through a normally closed aperture for cleaning purposes.

As is known there are sometimes provided two compartments in these strainers and in the case of a pipeline through which the flow of liquid is not to be interrupted means are provided for isolating one compartment whilst the strainer cage therein is cleaned, the other compartment allowing an uninterrupted flow of liquid to be maintained.

It is the object of the present invention to provide a pressure vessel such as a strainer of any of the above described types, with an easily removable cover which requires the minimum of time and effort to open and reseal.

According to the present invention a pressure vessel, for example a strainer for use in a pipeline through which passes a liquid to be strained comprising a housing in which is removably located a strainer cage, an aperture being provided (usually at the top) for inserting and removing the strainer cage and a cover plate therefor, is characterised in that the cover plate is pivotally mounted and upwardly spring loaded, the spring serving to break the joint between the housing and the cover plate so that the cover plate may be removed, and locking means for the cover plate consisting of a cross-bar pivotally mounted at the same point as the cover plate and adapted to be secured across the top of the latter, a centrally disposed locking screw being provided to secure the cover plate into sealed relationship over the aperture, against the pressure of the spring.

The invention will be described further, by way of example, with reference to the accompanying drawings in which:

Fig. 1 is a part sectional plan view of a strainer constructed in accordance with the invention, Fig. 2 is a perspective scrap view of part of the top of the strainer of Fig. 1 showing one cover plate in the open position and Fig. 3 is a perspective scrap view of part of the top of the strainer of Fig. 1 showing one cover plate in the closed position.

A strainer for use in a pipeline through which passes a liquid to be strained consists of a housing 10 which is fitted with end covers 10a provided respectively with an inlet port 11 and an outlet port 12 to which the pipe ends (not shown) of the pipeline are secured. The housing 10 is divided longitudinally into two compartments 13 and 14, each of which has an aperture 15 at the top through which may be inserted or removed a strainer cage 16 of hollow cylindrical form. Across the inlet and outlet sides 11 and 12 of the housing are located transverse worm screws 17 and 18 upon each of which rides a gate 19, one only of which is visible. Each of the two compartments 13 and 14 has, on the inlet side, an opening 20 which is capable of being closed by the gate 19. The outlet side of each compartment also has an opening (not shown) which can be closed by a similar gate located at the outlet side of the housing. Outside the end covers 10a of the housing 10 and secured to the ends of each worm screw 17, 18 is a control wheel 21, 21a which is adapted, on rotation, to move its respective gate 19 transversely across the width of the housing 10. The outer end of each of the worm screws carries a collar 22 upon which is located a pointer 23 and parallel to the screw is a graduated arm 24 which, in conjunction with the pointer 23, indicates the position of the gate 19 within the end cover 10a. It will be seen that by this arrangement either one of the compartments 13, 14 can be sealed off at both the inlet and outlet sides of the housing 10.

Secured to the housing 10 adjacent each aperture 15 through which the strainer cage 16 is inserted or removed is, at diametrically opposite points, an upstanding pillar indicated generally by the reference numerals 25 and 25a. One of these pillars 25 is provided with a hole 27 therethrough into which fits a locking pin 28. The other pillar 25a (a swivel pillar) is of round section and has pivotally mounted at the lower end thereof a collar 29 which carries, and is integral with a cover plate 30 for the aperture 15. Also around the swivel pillar 25a and between the collar 29 and the housing 10 is a compression spring 31 which is strong enough to hold the cover plate 30 away from the housing 10. Pivotally mounted on the swivel pillar 25a above the collar 29 is a cross bar 32 which has a centrally disposed locking screw 33 one end of which abuts the top of the cover plate 30 and holds the latter in the closed position (as shown in Fig. 3) when the strainer is in use. At the free end of the cross bar 32, which may be of solid construction and be bifurcated at the said free end, or of plate construction as shown and have spacing members 34 and 34a for the plates which form the cross bar 32, is provided a hole 35 adapted to be aligned with the hole 27 in the pillar 25 to receive the locking pin 28.

In the construction shown in Figs. 2 and 3 the spacing member 34 serves the purpose of providing a location for the locking screw 33. The spacing member 34 through which passes the locking screw 33 is, of course, drilled and tapped to provide engagement for the thread of the locking screw 33 whilst the other spacing member 34a is in the form of a collar around the pillar 25. This spacing member 34a is provided with trunnions 34b which allow pivotal movement of the cross bar 32 through a vertical arc whilst the collar allows movement of the pillar through a horizontal arc (as will be described).

In use, when one of the strainer cages 16 becomes choked, an operative, by rotation of the control wheels 21, 21a moves the gates 19 and thereby isolates that strainer 16 from the flow of liquid. By rotation of the locking screw 33 in an anti-clockwise direction the cover plate 30 is relieved of the downward pressure exerted by the screw and the spring 31 lifts the plate 30 away from the housing 10. The cover plate 30 can then be pivoted about the swivel pillar 25a until it is clear of the aperture 15. After removal of the locking pin 28 the cross bar 32 can be pivoted upwardly until it is clear of the end of the pillar 25, and then horizontally into the position shown in Fig. 2. The strainer cage 16 can then be removed and cleaned, after which it can be replaced and the cover plate 30 locked in position over the aperture 15. If desired, the gates 19 can now be positioned to isolate the second strainer cage 16 and the cleaning operation repeated in the case of the second strainer.

It will be realised that the above description refers to a strainer of the type used when it is necessary to have an uninterrupted flow of liquid through the pipeline but it is not to be considered a limiting factor as the invention can be applied to a strainer having only one compartment and one strainer cage, or any pressure vessel requiring a quickly-removable cover.

I claim:

1. In a pressure vessel including a housing, a strainer cage located in said housing and removable through an aperture therein, the improvement which comprises a cover plate for said housing, a vertical swivel pillar, said cover plate being pivoted perpendicular to and slidable axially on said pillar, resilient means bearing against said housing and urging said plate out of contact with said housing, locking means for said cover comprising a cross bar so mounted on said swivel pillar that said cross bar pivots in a plane parallel to the plane in which said cover plate pivots and also in a plane perpendicular thereto, said crossbar being adapted to be secured across the top of said cover plate, and a locking screw for securing said cover plate into a sealed relationship with said housing against the pressure of said resilient means.

2. In a pressure vessel according to claim 1, the further improvement wherein the means by which said cross bar is adapted to be secured across the top of said cover plate comprises a pillar placed diametrically opposite said swivel pillar, said pillar having a hole therethrough adjacent to its free end, a locking pin for securing said cross bar to said pillar passing through said hole in said pillar and aligned holes in said cross bar.

References Cited in the file of this patent

UNITED STATES PATENTS

| | | |
|---|---|---|
| 1,213,764 | Elliott | Jan. 23, 1917 |
| 1,487,518 | Nichols | Mar. 18, 1924 |
| 1,582,450 | Chester | Apr. 27, 1926 |
| 2,176,306 | Kuss | Oct. 17, 1939 |